I. HALL.
METAL MELTING FURNACE.
APPLICATION FILED NOV. 13, 1913.
1,117,667.
Patented Nov. 17, 1914.
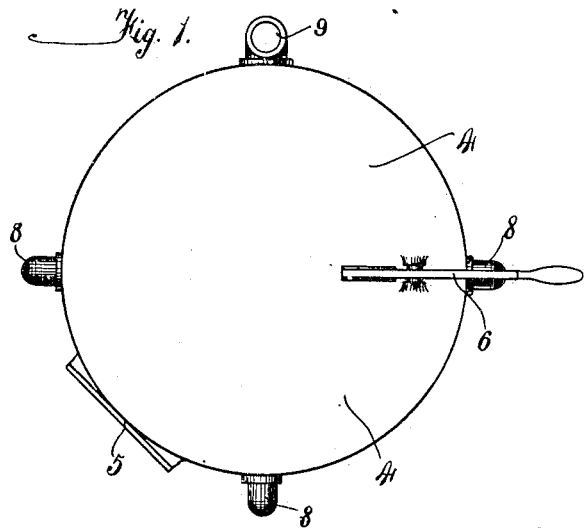
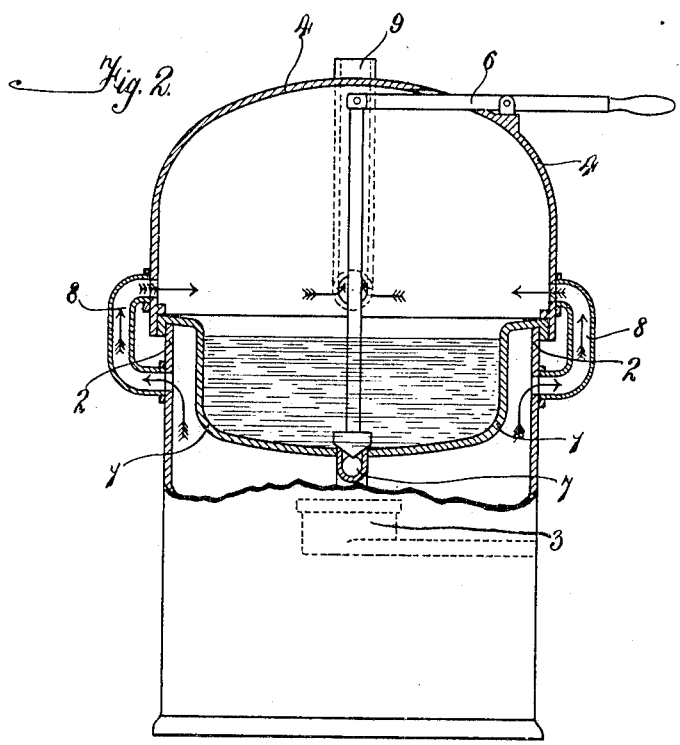
WITNESSES
INVENTOR
ISAIAH HALL
ATTORNEY

UNITED STATES PATENT OFFICE.

ISAIAH HALL, OF BIRMINGHAM, ENGLAND.

METAL-MELTING FURNACE.

1,117,667.  Specification of Letters Patent.  Patented Nov. 17, 1914.

Application filed November 13, 1913. Serial No. 800,865.

*To all whom it may concern:*

Be it known that I, ISAIAH HALL, subject of the King of Great Britain, residing at Exchange Buildings, New street, Birmingham, in the county of Warwick, England, have invented a new and useful Metal-Melting Furnace; and I do hereby declare the following to be a full, clear, and exact description of the same.

This invention relates to metal melting furnaces, and is more especially concerned with such furnaces as are adapted for the melting of used metal, cleansing it and casting it into ingots, especially for the melting of type metal.

The object of the invention is to provide a more efficient furnace and to minimize the oxidation which usually takes place on the surface of the molten metal in common types of such furnaces.

Referring to the accompanying drawings:—The melting pot 1 is supported upon the casing 2, completely inclosing the upper end of the same so as to form a chamber in which is disposed the gas burner 3. Over the melting pot is disposed the dome-shaped cover 4 forming a second chamber above the surface of the metal. The metal is charged through a door 5 disposed in this cover 4 and there is also an arm 6 arranged to regulate the flow of the molten metal to the pouring spout 7 or other means for the same purpose, and consequently it is not easy to keep this upper chamber airtight. Accordingly I provide means for passing the gaseous products of combustion continually over the whole surface of the molten metal in the pot.

In the construction shown in the drawings connecting pipes 8, 8 are shown leading from the chamber in which the gas burner is located to the chamber above the pot, the flue 9 being disposed at still another point upon the cover. In this manner products of combustion are passed into the periphery of the pot and drawn over the surface of the molten metal on their way to the flue, and any air which passes into the chamber will either be drawn direct to the flue or will form an inconsiderable proportion of the total quantity of gas in contact with the surface of the metal.

What I claim then is:—

1. In a metal melting furnace, the combination of a melting pot; a chamber below the melting pot; means for burning fuel within the said chamber; a cover inclosing the upper side of said melting pot and forming a closed chamber above the same; a pipe adapted to lead the products of combustion from said chamber to the periphery of the said cover and into the melting pot; and a flue leading from the periphery of said cover disposed at the same level as the aforesaid pipe.

2. In a metal melting furnace, the combination of, a melting pot; a chamber below the melting pot; means for burning fuel within said chamber; a cover inclosing the upper side of said melting pot, and forming a closed chamber above the same; a pipe external to the chamber below the melting pot, and covering and communicating both with said chamber and cover, being adapted to convey the products of combustion from the chamber to the cover, and a flue leading from the periphery of said cover, disposed substantially at the same level as the aforesaid pipe, and being arranged at a point substantially diametrically opposite to the pipe.

3. In a metal melting furnace, the combination of, a melting pot; a chamber below the melting pot; means for burning fuel within the said chamber; a cover inclosing the upper side of said melting pot and forming a closed chamber above the same; a plurality of external pipes communicating both with the said chamber and with the cover, said pipe being adapted to lead the products of combustion from said chamber to the periphery of the said cover and into the melting pot; and a flue leading from the periphery of said cover disposed substantially on the same level as the aforesaid pipes, the pipes and flue being symmetrically arranged around the furnace.

In testimony whereof, I have signed my name to this specification in the presence of two subscribing witnesses.

ISAIAH HALL.

Witnesses:
HAROLD J. C. FORRESTER,
EVAN L. W. BYRNE.